United States Patent
Vyse et al.

(10) Patent No.: US 7,600,789 B2
(45) Date of Patent: Oct. 13, 2009

(54) LOCKWIRELESS ANTI-ROTATION FITTING

(76) Inventors: Gerrard N. Vyse, 620 Sandy Beach Rd., Azle, TX (US) 76020; Peter J. Stroempl, 3509 Stone Creek Way, Fort Worth, TX (US) 76137

( * ) Notice: Subject to any disclaimer, the term of this patent is extended or adjusted under 35 U.S.C. 154(b) by 0 days.

(21) Appl. No.: 11/093,698

(22) Filed: Mar. 30, 2005

(65) Prior Publication Data
US 2006/0061094 A1   Mar. 23, 2006

Related U.S. Application Data

(63) Continuation-in-part of application No. 11/059,239, filed on Feb. 16, 2005, now abandoned, which is a continuation of application No. 10/444,005, filed on May 22, 2003, now Pat. No. 6,857,665.

(60) Provisional application No. 60/398,532, filed on Jul. 24, 2002.

(51) Int. Cl.
*F16L 55/00* (2006.01)

(52) U.S. Cl. ....................... 285/91; 285/305

(58) Field of Classification Search ............. 285/305, 285/276, 90, 91
See application file for complete search history.

(56) References Cited

U.S. PATENT DOCUMENTS

| | | | | |
|---|---|---|---|---|
| 1,416,232 A | * | 5/1922 | Osborn | 285/91 |
| 1,691,599 A | * | 11/1928 | Zimmermann | 285/92 |
| 2,051,899 A | | 8/1936 | Rose | |
| 2,355,166 A | * | 8/1944 | Johanson | 285/82 |
| 2,642,108 A | | 6/1953 | Geistert | |
| 2,731,058 A | | 1/1956 | Smisko | |
| 2,890,073 A | * | 6/1959 | Thomas | 285/305 |
| 3,207,535 A | * | 9/1965 | Wilson | 285/86 |
| 3,425,406 A | * | 2/1969 | Mejyr | 285/401 |
| 3,807,774 A | | 4/1974 | Heath, Jr. | |
| 4,007,953 A | * | 2/1977 | Powell | 285/321 |
| 4,834,667 A | * | 5/1989 | Fowler et al. | 439/321 |
| 4,917,003 A | * | 4/1990 | Kollross | 92/220 |
| 5,058,930 A | | 10/1991 | Schlosser | |
| 5,083,819 A | | 1/1992 | Bynum | |
| 5,152,499 A | | 10/1992 | Silverman et al. | |

(Continued)

FOREIGN PATENT DOCUMENTS

DE           715972           1/1942

(Continued)

*Primary Examiner*—Aaron M Dunwoody
(74) *Attorney, Agent, or Firm*—John A. Molnar, Jr.

(57) ABSTRACT

A lockwireless, anti-rotation fitting for connection to a connector. The fitting includes a coupler having a series of circumferential engagement portions disposed about an outer peripheral surface, and a nut receivable coaxially over the outer peripheral surface of the coupler, and which is threadably engageable with the connector. The nut has an opening through which is received the end of a locking mechanism. The locking mechanism end is interferingly engageable with the coupler engagement portions such that with the nut being received coaxially over the coupler outer peripheral surface of the coupler, the nut is threadably engageable with the connector urging the coupler into a sealing engagement with a sealing surface of the connector, and with the coupler being so engaged, the locking mechanism end is interferingly engaged with at least one of the coupler engagement portions delimiting the rotation of the nut relative to the connector.

4 Claims, 7 Drawing Sheets

U.S. PATENT DOCUMENTS

| | | | |
|---|---|---|---|
| 5,192,219 A * | 3/1993 | Fowler et al. | 439/321 |
| 5,215,336 A | 6/1993 | Worthing | |
| 5,340,163 A | 8/1994 | Merrer et al. | |
| 5,348,349 A * | 9/1994 | Sloane | 285/92 |
| 5,362,110 A | 11/1994 | Bynum | |
| 5,388,866 A | 2/1995 | Schlosser | |
| 5,435,760 A * | 7/1995 | Miklos | 439/321 |
| 5,558,376 A * | 9/1996 | Woehl | 285/276 |
| 5,586,790 A | 12/1996 | Bynum | |
| 5,823,702 A | 10/1998 | Bynum | |
| 6,293,595 B1 | 9/2001 | Marc et al. | |
| 6,302,447 B1 | 10/2001 | Lee | |
| 6,309,154 B1 | 10/2001 | Higgins | |
| 6,557,900 B1 | 5/2003 | Austin | |

FOREIGN PATENT DOCUMENTS

| | | |
|---|---|---|
| FR | 1525505 | 5/1968 |
| FR | 2 755 492 | 7/1998 |

* cited by examiner

LOCKWIRELESS ANTI-ROTATION FITTING

CROSS-REFERENCE TO RELATED CASES

This application is a continuation-in-part of U.S. patent application Ser. No. 11/059,239, filed Feb. 16, 2005 now abandoned, which is a continuation of U.S. patent application Ser. No. 10/444,005, filed May 22, 2003, now U.S. Pat. No. 6,857,665, which claims priority to U.S. Provisional Application Ser. No. 60/398,532, filed Jul. 24, 2002, the disclosures of each of which are expressly incorporated herein by reference.

BACKGROUND OF THE INVENTION

The present invention relates generally to compression-type fittings such as for coupling the end of a length of tubing to another member, and more particularly to such a fitting which is of an anti-rotation type and which may used as a replacement for conventional lock or safety wire fittings.

Compression fittings are widely used in a variety of instrumentation, pneumatic, hydraulic, process, power, refrigeration, industrial, mobile, transportation, aerospace, military, and other fluid power or control applications utilizing plastic or metal tubing. Typically employing an internally or externally threaded nut and an associated ferrule, flare, or other tube end which is formed or provided to seal between the tubing and a complementary-threaded, relative to the nut, nipple, adapter, body, or other connector, these fittings have been adapted for use with many different tubing types including metals such as copper, brass, steel, stainless steel, titanium, aluminum, and alloys such as nickel-copper, Hastelloy®, Alloy 600, 6Mo, Inconel®, Incoloy®, and the like, and many plastics.

Particularly for commercial or military aerospace applications, it may be specified, such as in accordance with Aerospace Standard AS1043 and Military Standard MS33540, that the fitting connection be safety or "lock" wired after assembly to prevent the accidental loosening of the fitting due to vibration or other forces which may be developed in the service environment. Representative lock wire fittings are shown, for example, in U.S. Pat. Nos. 3,807,774; 2,642,108; and 2,051,899.

In practice, the safety wiring of the connection can be difficult. Accordingly, special fittings have been designed which eliminate the need for safety wiring. Generally, these fittings employ a modified adapter having a collar or other arrangement of tangs which engage a series of grooves provided on the nut (or vice versa) so as to provide a ratcheting effect which in service delimits the rotation of the nut relative to the adapter, but which still allows for the connection to be disassembled using a wrench or other tool. Representative fittings of this type are shown, for example, in U.S. Pat. Nos. 6,309,154; 6,302,447; 6,293,595; 5,823,702; 5,586,790; 5,388,866; 5,362,110; 5,083,819; 5,058,930; and 2,731,058.

It is believed, however, that further improvements in the design of "lockwireless" fittings, i.e., anti-rotation fittings which do not employ a lock wire, would be well-received for commercial and military aerospace use, as well as for other applications. In this regard, the fittings which heretofore have constituted the state of the art typically must employ specially designed adapters and other components which may involve added expense, require special tools or steps for make-up, and/or may not be as robust as conventional componentry if dropped or otherwise subjected to rough handling. Accordingly, it is believed that particularly desired would be a "lock-wireless" fitting which employs more standard componentry, which is robust, and which may be made or disassembled in a more conventional fashion so as to have a familiarity to technicians and other involved in the installation or maintenance thereof.

SUMMARY OF THE INVENTION

The present invention is directed, broadly, to lockwireless fittings. More particularly, the invention is directed to a lockwireless fitting construction, such as for tubing, which eliminates the need for a special adapter, and which is robust and economical to manufacture.

In an illustrated embodiment, the fitting is provided in accordance with the precepts of the present invention as including a coupler and an associated nut and locking member which may be configured, for example, as a spring ring or, alternatively, as a spring-loaded pin. The coupler may be configured at one end for a welded or other connection to an end of a length of tubing or other conduit, and at an opposite end for sealing against an adapter or other connector. The nut is receivable over the coupler, and is rotatably threadably engageable with the adapter for urging the one end of the coupler into a compressive, sealing engagement with the adapter. The coupler is formed or otherwise provided as having a series of, for example, recesses disposed circumferentially about an outer peripheral surface thereof. The nut, in turn, is provided as having an opening formed through a wall thereof through which opening may be inserted an end of the locking member. Upon make-up, the end of the locking member ratchetably engages the recesses of the coupler outer surface. In service, such engagement delimits the rotation of the nut relative to the adapter, such as may be induced by vibratory or other external forces or loadings, so as to provide a self-locking feature. For disassembly, however, the locking member end be disengaged responsive to a torque which exceeds a certain threshold, such as may be developed by a wrench or other tool used to loosen the nut.

The present invention, accordingly, comprises the article possessing the construction, combination of elements, and arrangement of parts which are exemplified in the detailed disclosure to follow. Advantages of the invention include a fitting construction which uses conventional componentry to allow for assembly and disassembly in a familiar fashion, but which is self-locking for aerospace and other applications wherein the fitting will be exposed to vibration or other forces, or otherwise for applications requiring a locking fitting. Additional advantages include a fitting construction which is both robust and economical to manufacture, and further is resistant to environmental conditions. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward" and "rearward," "front" and "rear," "right" and "left," "upper" and "lower," "top" and "bottom," and "right" and "left" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "vertical" and "axial" or "horizontal" referring, respectively, to directions or planes perpendicular and parallel to the longitudinal central axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

For the illustrative purposes of the discourse to follow, the precepts of the fitting construction of the present invention are described in connection with a generalized adapter configuration such as a nipple. It is to be appreciated, however, that the present invention will find application in many connector configurations, such as unions, straights, tees, elbows, and crosses, and as port connections for valves, cylinders, manifolds, sensors, and other fluid components. Use within these and other configurations and components therefore should be considered to be expressly within the scope of the invention herein involved.

Figure 1:
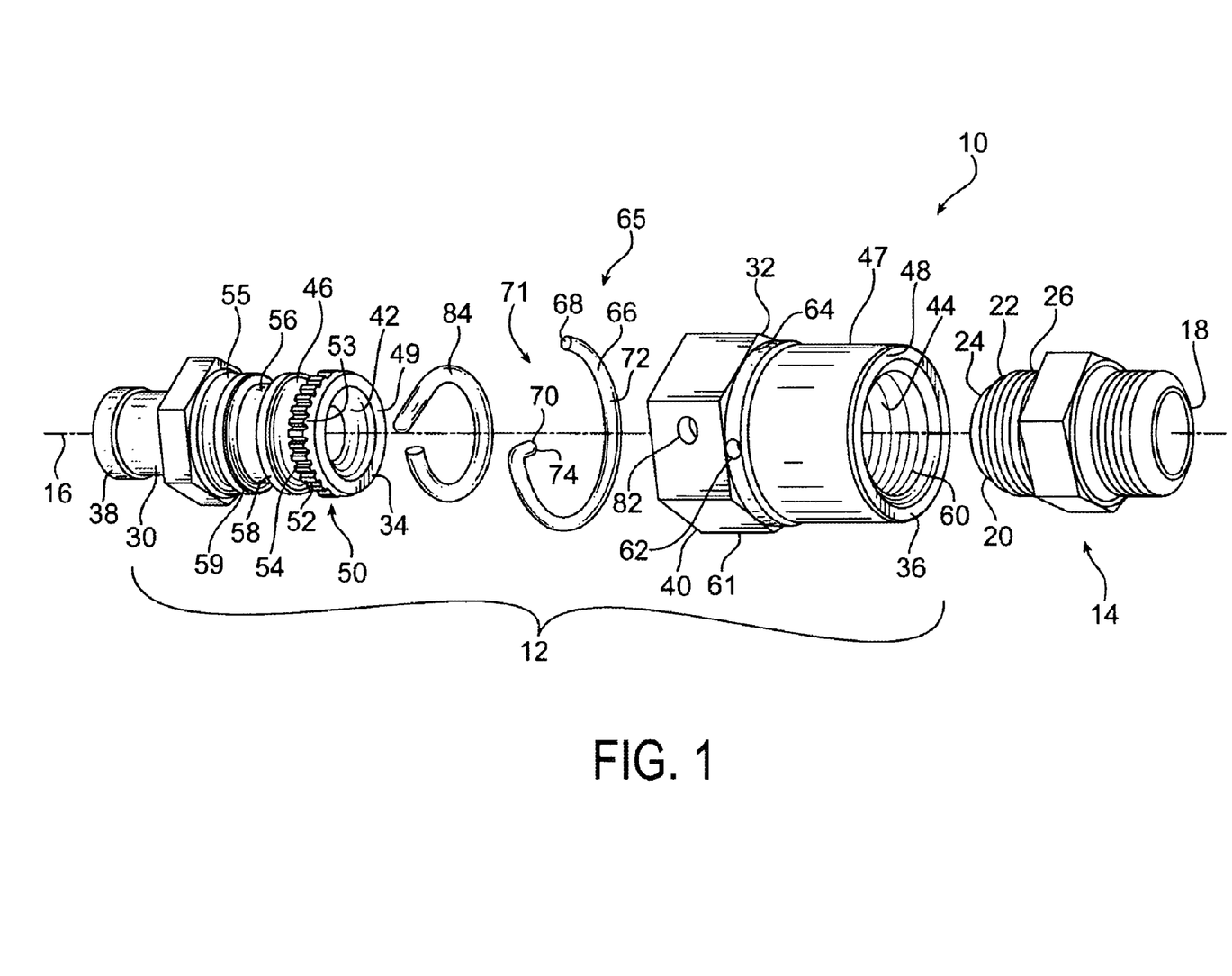
FIG. 1 is a perspective, exploded view showing a standard adapter/connector and a lockwireless fitting configured in accordance with the present invention for connection to the connector, the fitting including a coupler and an associated nut onto which a spring ring is mountable.

Referring then to the figures wherein corresponding reference characters are used to designate corresponding elements throughout the several views with equivalent elements being referenced with prime or sequential alphanumeric designations, a fitting connection in accordance with the present invention is shown generally at 10 in the exploded view of FIG. 1. As may be seen, connection 10 includes a fitting assembly, referenced generally at 12, which is configured in accordance with the present invention, and a connector, referenced generally at 14.

Connector 14 extends coaxially with a central longitudinal axis, 16, intermediate a forward end, 18, and a rearward end, 20. By way of convention, axial directions along axis 16, which for purposes of convenience will be used as a common reference axis for each of the components as arranged for the assembly of connection 10, will be referred to as "forward," "forwardly," or "front" if in the direction of or towards or adjacent the connector forward end 18, and as "rearward," "rearwardly," or "rear" if in the opposite direction of or towards or near the connector rearward end 20. The connector 14 has an outer surface, 22, which is configured adjacent the rearward end 20 to define a generally conical, tapered sealing surface, 24, and which is configured intermediate the sealing surface 24 and the forward end 18 to define an externally threaded portion, 26.

The fitting assembly 12 includes a generally annular coupler, 30, and associated nut, 32, each which extends along axis 16 intermediate a forward end, 34 and 36, respectively, and a rearward end, 38 and 40, respectively. Each of the coupler 30 and nut 32 also has an inner peripheral surface, 42 and 44, respectively, and a outer peripheral surface, 46 and 47, respectively, with the nut surfaces 44 and 47 defining a wall, 49, of the nut 32 therebetween. The coupler rearward end 38 may be configured for a welded or other connection to the distal end of a length of tubing (not shown) so as to allow for the fluid tight connection of the tubing end to the coupler 30 and, in turn, to the connector 14. For many applications the tubing will be metal, but alternatively may be plastic or a composite material. The coupler forward end 34, in turn, may be configured as at 50 to define a generally conical, tapered sealing surface which is the complement of the connector sealing surface 24 so as to be seatable thereagainst for the fluid-tight connection of the coupler 30 to the connector 14.

Coupler 30 is configured as having a series of engagement portions, referenced generally at 50, disposed circumferentially about at least a section of the outer peripheral surface 46. As may be seen with additional momentary reference to the radial cross-sectional view of coupler 30 shown in FIG. 3, engagement portions 50 may be provided as a series of radially spaced-apart recesses, one of which is referenced at 52, which may be machined, molded, stamped, or otherwise formed into or on, or otherwise disposed about the outer peripheral surface 46. Although the recesses 52 are shown to be generally concave "scallops" which are rearwardly tapered from a forward end wall, 53, and to be separated by ridges, one of which is referenced at 54, it will be appreciated that other shapes or configurations may be substituted, such as wherein the ridges 54 are replaced by convex scallops or other smoother junctures, or wherein the recesses 52 are configured as inclined ramps separated by steeply angled or even vertical walls to provide a more ratchet-like effect. Also, the term "recesses" is used in a broad sense to include any spaces which may be defined between the ridges 54 or the like, such that the "recesses" may actually be disposed on or radially beyond the peripheral surface 46, such as in the manner of the ridges 54 being formed as gear-like teeth extending radially from the surface 46, with the recesses 52 being defined therebetween to be disposed about the peripheral surface 46. Also, in the illustrative embodiment, the recesses are tapered from a rearward end, The coupler outer peripheral surface 46 also may be provided as having a circumferential ridge or other visual and/or tactile indicia or other indicator, 55, formed intermediate the rearward end 38 and the first engagement portions 50, and as having a circumferential groove, referenced at 56, formed therein intermediate the indicator 55 and the first engagement portions 50. As may be seen, the groove 56 terminates in one axial direction along axis 16 at a forward end wall, 58, and in the other axial direction at a rearward end wall, 59.

Nut 32 is configured, in turn, to be receivable coaxially over the coupler outer peripheral surface 46, with the inner peripheral surface 44 of the nut forward end 36 being internally threaded, as shown at 60, such that the nut is rotatably threadably engageable with the externally threaded portion 26 of the connector 14. In this regard, the nut outer peripheral surface 46 may be configured as having hexagonal or other flats, such as at 61, for engagement with a wrench or other make-up tool.

Nut wall 48 may be formed as having hole or other opening, 62, extending radially through the nut inner and outer peripheral surfaces 44 and 47. Such opening 62 may be located, for example, intermediate the nut forward end 36 and the flats 61, and may be formed thereat, such as by machining, molding, punching, stamping, or other operation, along with a groove, 64, which may be similarly formed in the nut outer peripheral surface 47 to extend circumferentially thereabout the nut 36.

A locking mechanism, referenced generally at 65, which in the fitting 12 is configured as a resilient split, i.e., "spring" ring, referenced generally at 66, is associated with the 36 for engagement with the coupler engagement portion 50 in the manner to be described. Ring 66 may be generally C-shaped as shown as bent or otherwise formed from, for example, a length a of flat, round, or other profile wire or strip. Such wire or strip typically may be formed of a metal or metal alloy, such as a steel, stainless steel, brass, aluminum, or other like, although other materials such as a plastic or ceramic could be substituted. Ring 66 extends circumferentially about axis 16 intermediate a first end, 68, and a second end, 70, which may be radially spaced-apart from the first end 68 by the gap or clearance designated at 71. Second end 70 may be bent or otherwise disposed generally normal or at some other angle relative to the remainder of the ring 66, which remainder defines a generally semicircular body portion, 72. Such body portion 72 may be sized with the clearance 71 to have a normal diametric or other extent which, for example, may be resilient expandable to be receivable over the nut outer peripheral surface 47, and which thereupon may be resiliently contractible to be seated in the groove 64 and therein compressively retained on the nut 36. The ring second end 70, in turn, may be sized, such as by having a given length and diametric extent, to be receivable through the nut opening 62 and, with the ring portion seated in the grove 64, to so extend into the interior of the nut 36 so as to be receivable in the engagement portions 50 or otherwise to be interferingly engageable therewith. The tip, 74, of the end 70 may be flat, but typically may be round, beveled, chamfered, or otherwise configured to assist in the ratcheting of the ring end 70 over the engagement portion 50. Although ring 66 is shown in the embodiment depicted in FIG. 1 to have only one such end 70, it should be appreciated that the other end 68 may be similarly oriented to form a pair of such ends.

Figure 2:
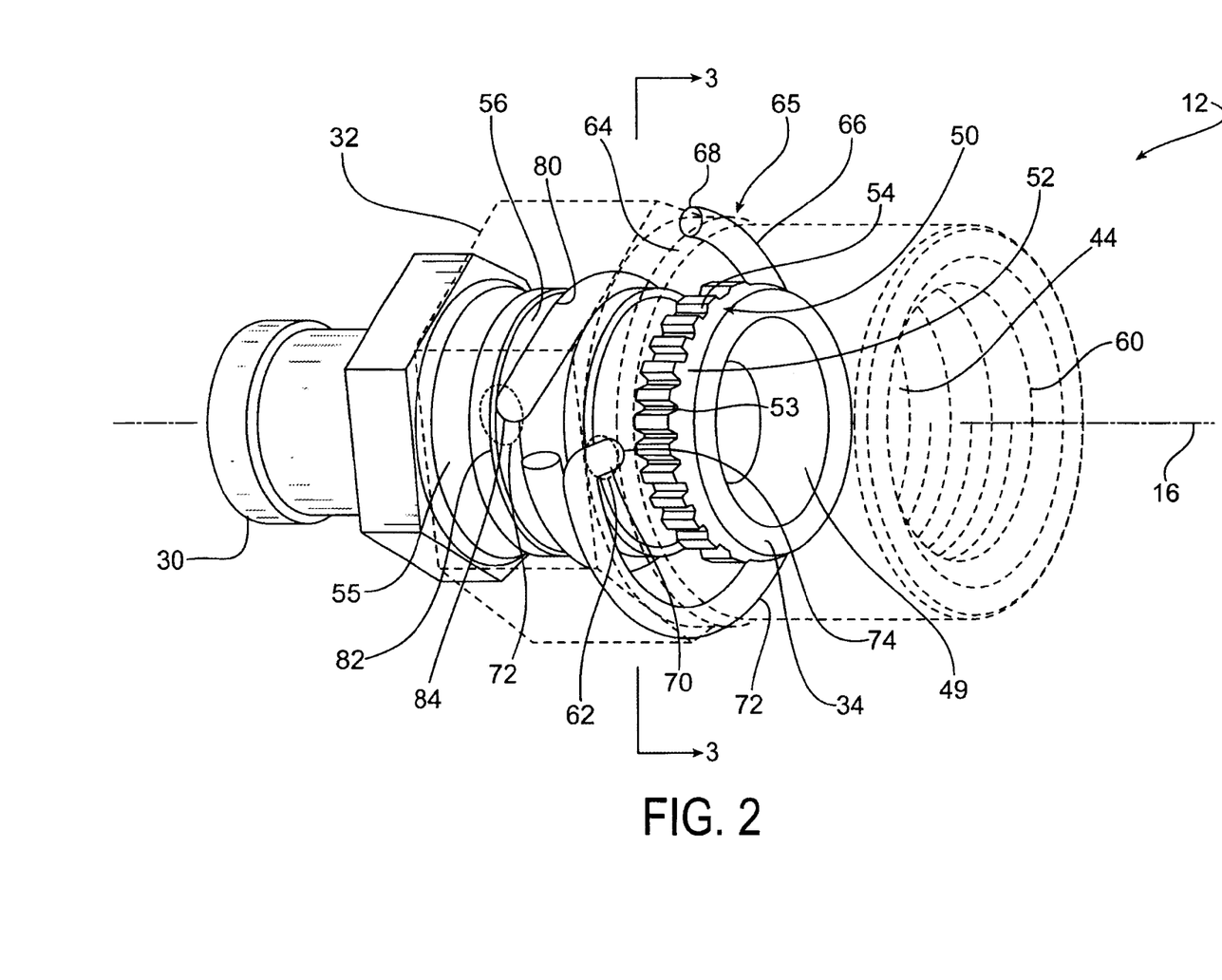
FIG. 2 is perspective view showing the fitting of FIG. 1 as assembled, the nut being shown in transparency or phantom to reveal certain details of the construction which otherwise would be hidden from view.

For attaching the nut 36 to the coupler 30, and as may be seen with momentary reference to the assembly view of FIG. 2, the nut inner peripheral surface 44 may be provided as having a circumferential internal groove, 80, which may be formed, for example, intermediate the nut second end 40 and the external groove 64. Internal groove 80 may be accessible externally via an adjoining hole, 82, which may be formed through the nut wall 48 generally in the manner described in connection with opening 62 but as may be somewhat skewed relative to the axis 16.

Each of the hole 82 and groove 80 may be configured to receive a thrust wire, 84, which may function as an internal shoulder or other thrust surface of the nut 32. That is, with the nut 32 being been received over the coupler outer peripheral surface 46, wire 84 may be inserted through the hole 82 and into the groove 80. With the groove 80 and the coupler groove 56 being aligned in coaxial registration, the wire 84 so inserted into the nut groove 80 thereby may also be received within the coupler groove 56 to lock nut 32 onto the coupler 30.

With reference now again to FIG. 2, the fitting 12 is shown as assembled for connection to the connector 14 of FIG. 1. As assembled, ring 66 is retained in the groove 64 coaxially on the nut 32, with the ring end 70 being received through the opening 82 and into one of the coupler engagement portions 50 effecting an interfering engagement therewith. Further in such assembly of the fitting 12, the nut 32 is received coaxially over the coupler 30 with the thrust wire 84 being received for axial, i.e., translational, movement within the coupler groove 56. That is, the nut 32 is moveable axially relative to coupler 30 from a rearward position wherein the wire 84 is disposed between the groove walls 58 and 59 (FIG. 1) allowing for the generally free rotation of the nut 32 on the coupler 30 to the forward position depicted in FIG. 2. In such forward position, the wire 84 engages the groove wall 58 (FIG. 1) for drawing the coupler forward end 34 and the sealing surface 49 thereof into a sealing engagement with the connector sealing surface 24 (FIG. 1) as the nut 34 is rotatably threaded onto the connector 14 via the enmeshing of the nut threads 60 and the connector threads 26 (FIG. 1). Further in such forward position, the ring end 70 is received within one of the recesses 50, or is otherwise interferingly engaged therewith, delimiting the rotation of the nut 32 relative to the connector 14.

Figure 3:
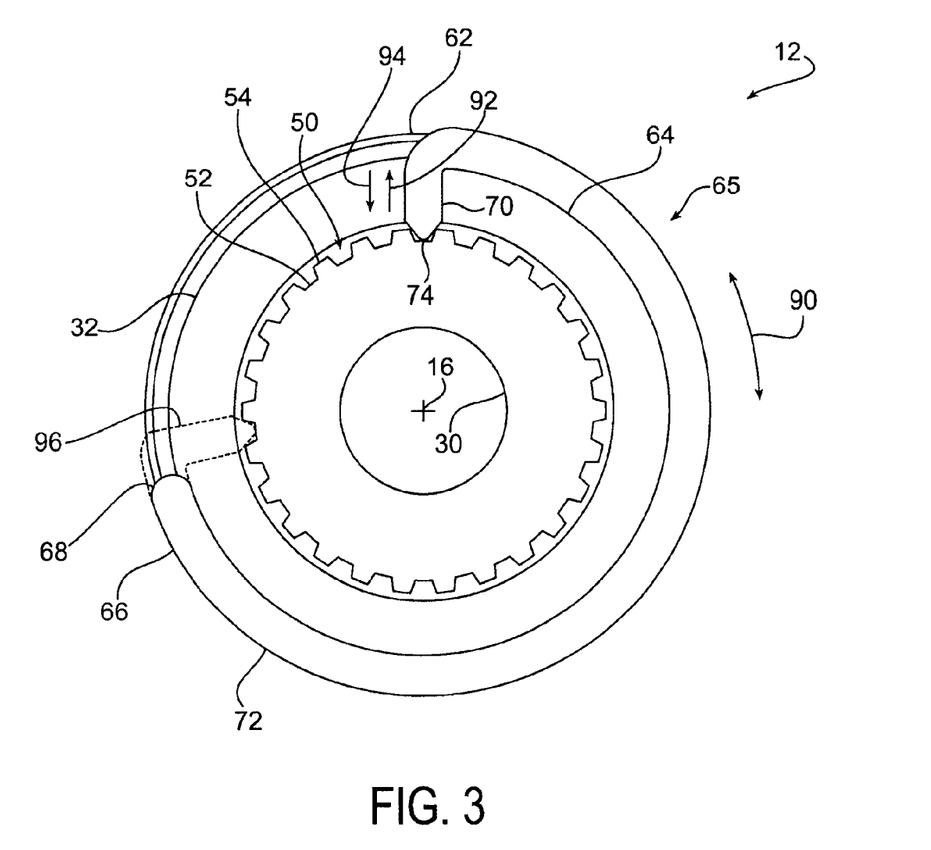
FIG. 3 is a cross-sectional view of the fitting of FIG. 2 taken through line 3-3 of FIG. 2.

In such engagement, and as may be better appreciated with reference now to the cross-sectional view of FIG. 3, in such engagement, the rotation of the nut during make-up or break in either of the rotational directions, i.e., clockwise or counterclockwise, represented by the arrow 90, upon the application of a sufficient applied torque, such as using a wrench or other tool, effects the resilient expansion of the diametric extent of the body portion 72 of the ring 66 in response to the movement of the ring end 70 in the radial outward direction reference by the arrow 92 as the ring 66 is "opened" by the camming action of the engagement portion ridges 54 on the ring end 70. Such opening of the ring 66 allows the end 70 thereof to pass over the engagement portions 50 to allow for the nut 32 to be either tightened or loosened on the connector 14 (FIG. 1). However, on final make-up, the resilient contraction or "closing" of the ring in response to the movement of the ring end 70 in the radial inward direction indicated by the arrow 94 allows the end 70 to be seated or otherwise received within one of engagement portion recesses 52. In this regard, as the frictional, spring, and/or other forces developed by the ratchet-like engagement between the ring end 70 and the recess 52 must be overcome for the nut 32 to rotate relative to the connector 14, such engagement thereby is effective in service to resist vibration and other external forces which otherwise could have the tendency to loosen the connection 10. As mentioned, and as is now depicted in phantom at 96 in FIG. 2, the second end 68 may be configured as a second end 70 and, as received through a corresponding opening provided through the nut 32, may effect a second interfering engagement with the engagement portions 70.

Returning to FIG. 2, when the connection 10 of FIG. 1 is fully tightened or made-up, the indicia 55 on the coupler outer peripheral surface 46 may be revealed from under nut 32 so as to provide a visual and/or tactile indication that such connection has been secured. Advantageously, ring 66 may be located on the on the nut 32 such that the ring end 70 engages one of the coupler recesses 52 near the end of the make-up so as to allow for a normal, i.e., non-locking connection along most of the length of the thread 60. However the final make-up is approached near the end of the nut 32 travel on the connector 12 (FIG. 1), a "click" sound ma be heard as the ring end 70 is first received within one the recesses 70 providing an audible indication that the connection is secure. With a relatively tight dimensional tolerance able to be maintained between the ring end 70 and the nut opening 82, the locking mechanism 65 of the fitting 12 is protected from dirt, dust, and other environmental contaminants.

Figure 4:
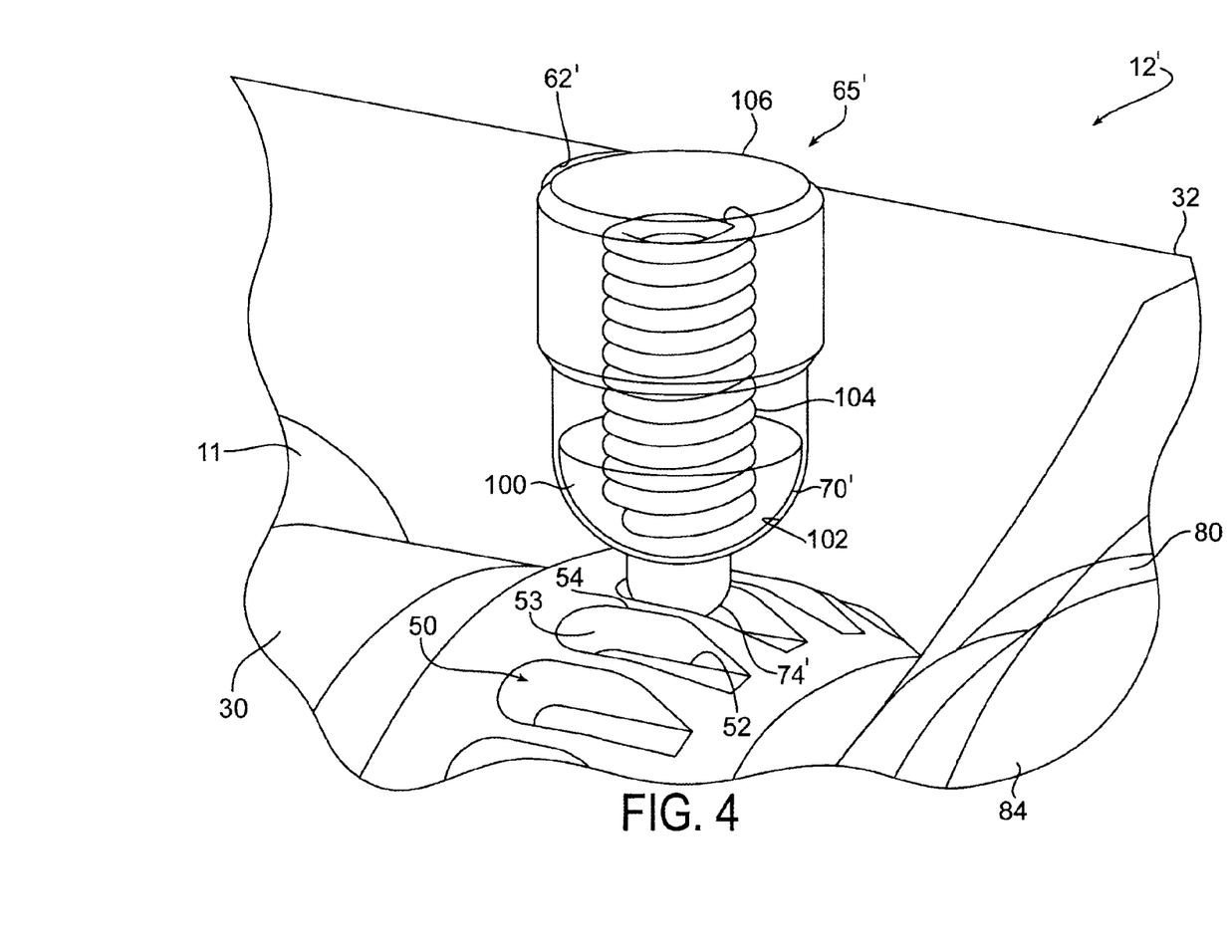
FIG. 4 is an enlarged perspective view of detail of an alternative embodiment of the fitting of FIG. 1 wherein the spring ring thereof is replaced by a spring-loaded pin and plug mechanism, the nut, pin, and plug being shown in transparency or phantom.
Figure 5:
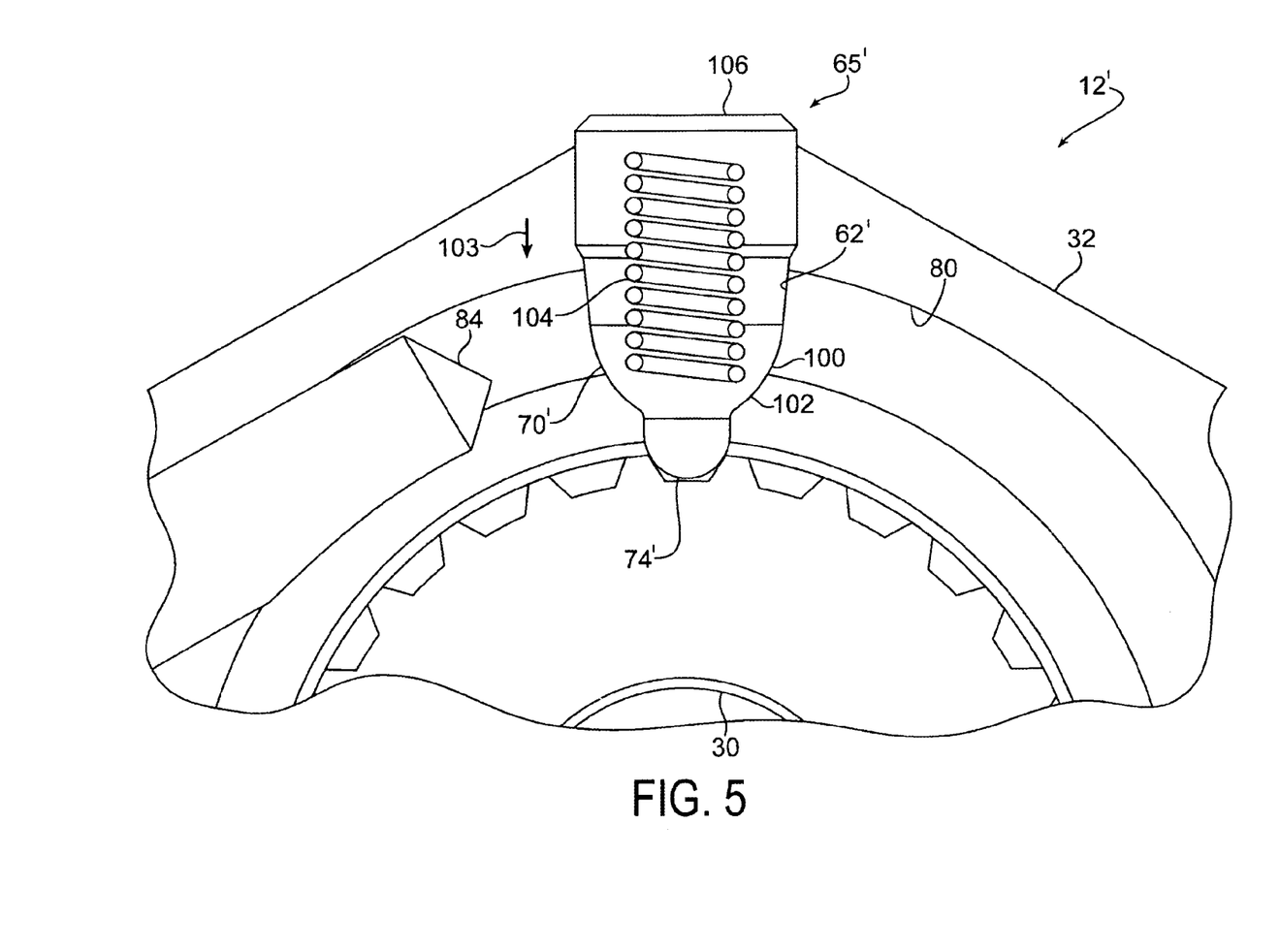
FIG. 5 is a cross-sectional view of the fitting of FIG. 4 taken through line 5-5 of FIG. 4.
Figure 6:
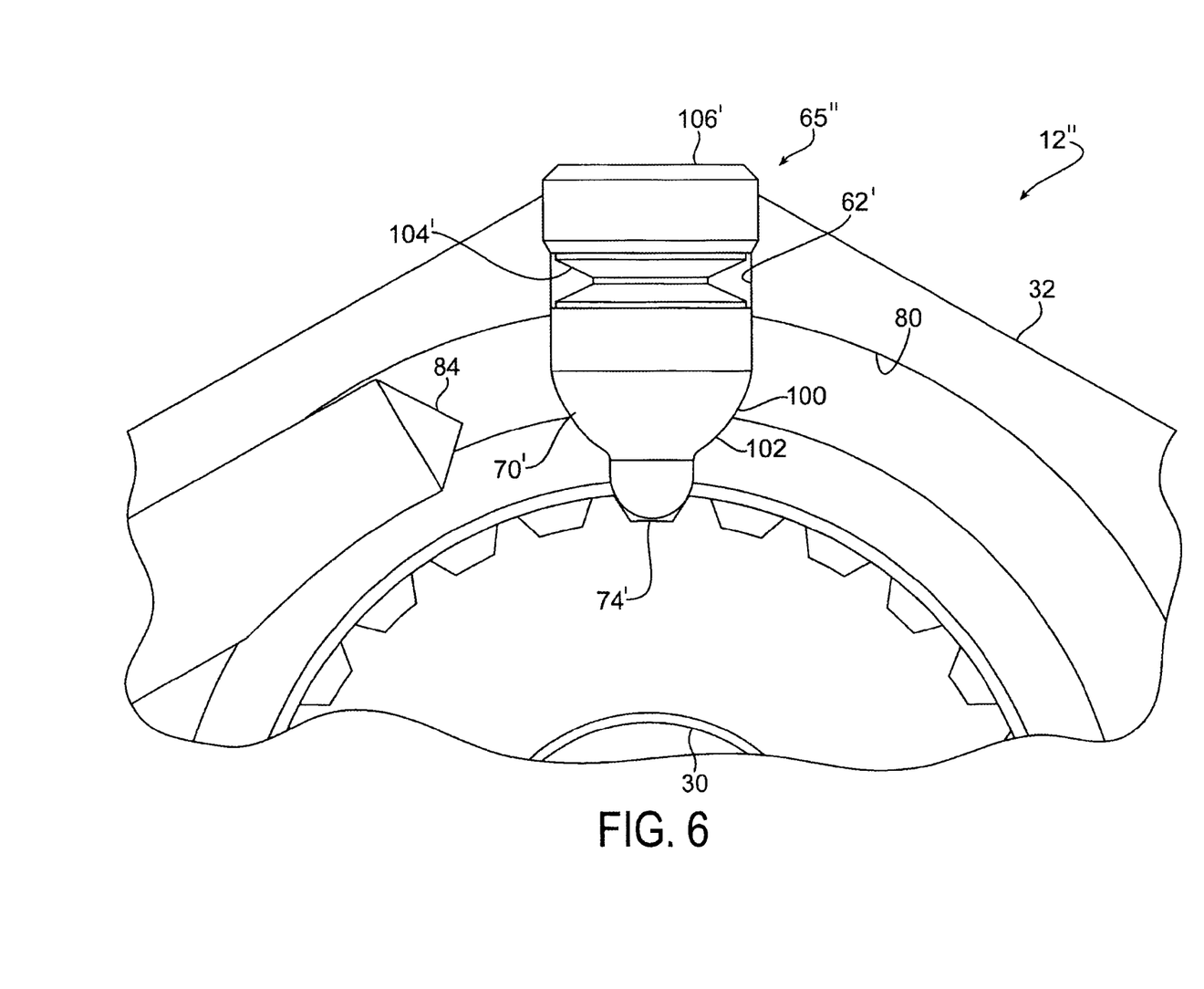
FIG. 6 is a cross-sectional view as in FIG. 5 shown an alternative embodiment of the spring-loaded pin.
Figure 7:
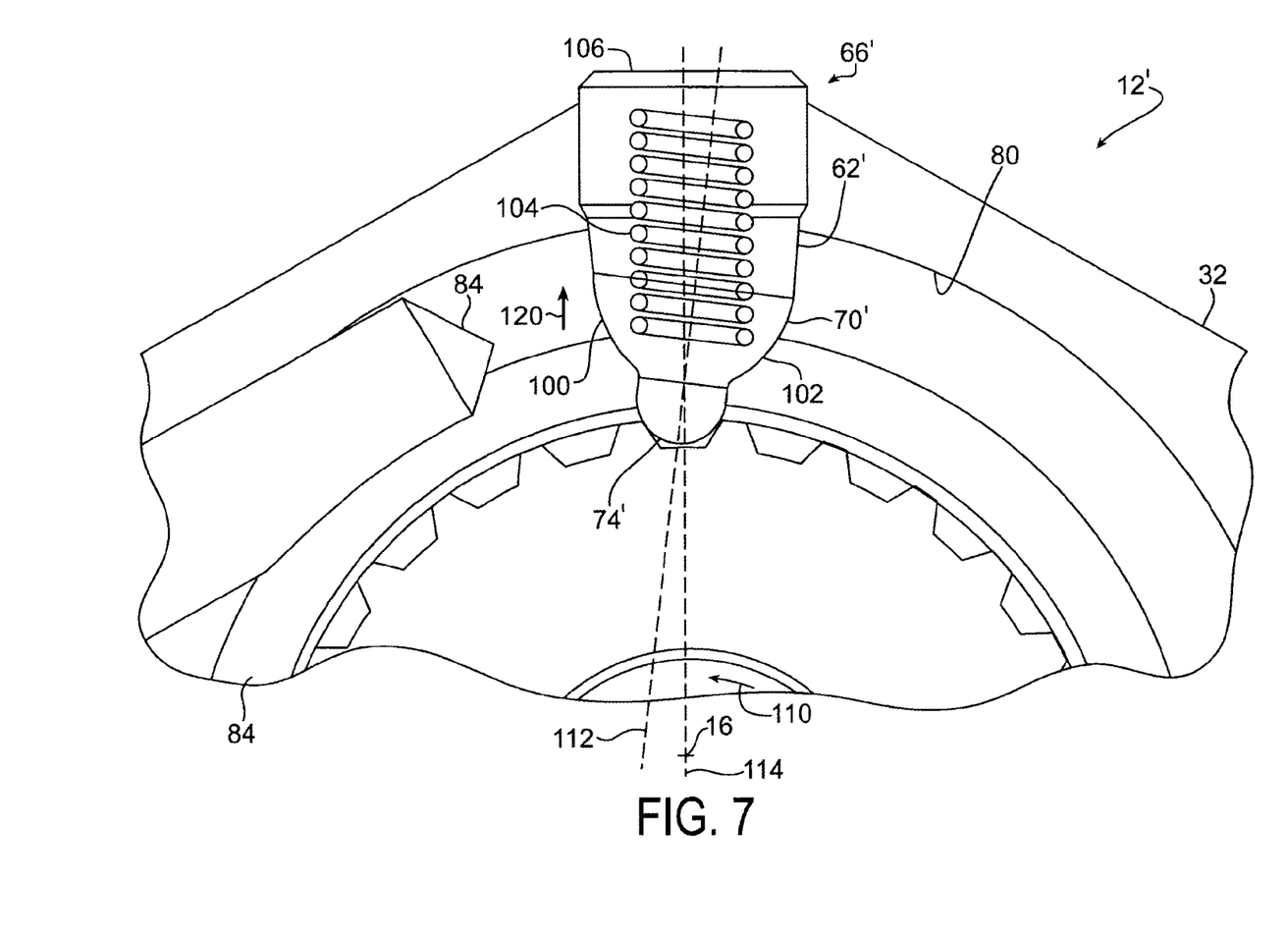
FIG. 7 is a cross-sectional view as in FIG. 5 shown the deflection of the pin in responsive to the rotation of the nut.

Turning now to FIGS. 4-7, alternative locking mechanisms 65 for fitting 12 are shown for illustrative purposes at 65' in FIGS. 4, 5, and 7, and at 65" in FIG. 6. With reference first to FIG. 4, the assembled fitting 12 as in FIGS. 2 and 3 reappears at 12' wherein the locking mechanism 65' thereof is shown in enhanced detail. In the embodiment 12' of FIG. 4, locking mechanism 65' has an end, 70', which is now configured as a pin mounted in the nut opening 82'. Pin 70' itself may be configured as having, relative to the opening 82', an internal ball portion, 100, which may be pivotally or otherwise retained in a narrowed portion, 102, of the opening 82', and an external nub, 74', which corresponds to the end 74 of the ring 66 (FIG. 1) in extending through the opening 82' for interfering engagement with one of the engagement portion recesses 52. Pin 70' may be normally biased in the extended position shown in FIG. 4 and in the cross-sectional view of FIG. 5 as indicated by the arrow referenced at 103, wherein the nub 74' is interferingly engages one of the engagement portions 50 as received within one of the recesses 52, by means of a compressible spring, 104, which may be interposed between the pin 70' and an associated plug, 106, which may be used to seal the nut opening 82'. Spring 104 may be a coiled spring as shown in FIGS. 4, 5, and 7, or another type of spring such as one of a beveled-washer type as shown at 104" in FIG. 6.

Referring now lastly to FIG. 7, it may be seen that, as nut 32 is rotate, such as in the direction indicated by the arrow 110, the pin 70' may be pivotally deflected off-axis, as is indicated at 114, from a central axis, 116, or otherwise made to retract in the direction indicated at 120, responsive the camming action of the engagement portion ridges 54 on the pin nub 74'. In such retracted position, the pin 70', as before with the ring end 70, is able to pass over the engagement portions 50 so as to allow for the nut 32 to be either tightened or loosened on the connector 14 (FIG. 1).

The materials of construction for the componentry of the connection 10 may be considered conventional for the application involved, and as generally may be selected for strength, corrosion or temperature resistance, or other physical or mechanical property, or otherwise for compatibility with the tubing being used, the service environment, and/or the fluid being handled. Such fluid may be a liquid such as water, hydraulic oil, a hydrocarbon fuel or other petrochemical, or a process stream. Alternatively, the fluid may be air, such as in a pneumatic application, or another gas.

Although plastics, composites, and other materials may be used where the application permits, the connection componentry in general may be machined, stamped, cast, molded, or otherwise constructed of a metal, which may be same or different for each of the components, such as copper, brass, steel, stainless steel, titanium, or aluminum, or an alloy such as nickel-copper, Hastelloy®, Alloy 600, 6Mo, Inconel®, or Incoloy®. If necessary or desired, the components may be case hardened by a chemical process such as nitriding, carburizing, or Kolsterizing, or by heat treatment or other treatment method such as precipitation hardening, work hardening, or a surface coating or plating. Additionally, the work surfaces may be coated, such as by a chemical solution plating or another means such as a physical or chemical vapor deposition, with molybdenum disulfide, silver or other lubricious material to reduce the required assembly torque and/or any potential for galling.

Thus, a unique "lockwireless" fitting construction is described herein which eliminates the need for a special adapter, and which is robust and economical to manufacture. Such construction, moreover, employs componentry which is standard in the field, and the use of which will be readily familiar to most installation or maintenance technicians and other personnel.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A connection comprising:
   a connector having a rearward sealing surface;
   a generally annular coupler extending intermediate a coupler forward end, and having a coupler outer peripheral surface, and a series of engagement portions disposed circumferentially about at least a section of the coupler outer peripheral surface;
   a generally annular nut receivable coaxially over the coupler peripheral surface, the nut extending intermediate a nut forward end, and having a nut inner peripheral surface and a nut outer peripheral surface, and an opening extending through the nut inner and outer peripheral surface; and
   a locking mechanism having an end received through the opening in the nut, the locking assembly end being interferingly engageable with the coupler engagement portions,
   wherein the nut rearward end is received coaxially over the coupler outer peripheral, and the nut forward end is threadedly engaged with the connector urging the coupler forward end into a sealing engagement with the connector sealing surface,
   wherein with the coupler forward end being so engaged with the connector sealing surface, the locking mechanism end is interferingly engaged with at least one of the coupler engagement portions delimiting the rotation of the nut relative to the connector, and
   wherein the locking mechanism comprises a spring ring, the spring ring having a body portion received over the nut outer peripheral surface, and an end portion which comprises the locking mechanism end.

2. The connection of claim 1 wherein:
   the coupler engagement portions are configured as a series of recesses disposed about the coupler outer peripheral surface; and
   the locking mechanism end is interferingly engaged with the at least one of the coupler engagement portions delimiting the rotation of the nut relative to the connector by being received within one of the recesses.

3. The connection of claim 1 wherein the body portion of the spring ring is resiliently expandable radially for the end portion to pass over the engagement portions as the nut forward end is rotatable threadably engaged with the connector, and is resiliently contractible for the end portion to interferingly engage the at least one of the coupler engagement portions delimiting the rotation of the nut relative to the connector.

4. The connection of claim 1 wherein the nut outer peripheral surface has a circumferential groove formed therein, the body portion of the spring ring being received within the groove.

* * * * *